Feb. 3, 1970 W. M. BARDEAU 3,493,726
COATED GRILLING SURFACES
Filed Nov. 20, 1967

*INVENTOR:*
WILLIAM M. BARDEAU
BY

PATENT AGENT

United States Patent Office 3,493,726
Patented Feb. 3, 1970

3,493,726
COATED GRILLING SURFACES
William M. Bardeau, 44 Princess Margaret Blvd.,
Islington, Ontario, Canada
Filed Nov. 20, 1967, Ser. No. 684,426
Int. Cl. H05b 3/68
U.S. Cl. 219—443                              7 Claims

ABSTRACT OF THE DISCLOSURE

A grilling surface which consists of a sublayer on which a distributed pattern of raised ridges is provided. The sublayer is coated with a material, such as PTFE which is resistant to scarring, which can withstand temperatures up to 600° F. and which neither contaminates nor sticks to food.

---

This invention relates to grilling surfaces, and has to do particularly with grilling surfaces having thereon a coating, such as polytetrafluoroethylene (PTFE), to prevent food materials from sticking to the grilling surface.

One of the problems encountered with present coated grilling surfaces relates to the tendency of the coating to be scraped or abraded away from the metallic sublayer after repeated scrapings with spatulas, knives, and other utensils. This problem arises due to the soft nature of the coating.

In view of the above problem, it is an object of this invention to provide a coated grilling surface in which the tendency of the coating to be scraped or abraded away is substantially eliminated.

Accordingly, this invention provides a grilling surface comprising: a substantially flat heat-conductive sublayer having on the surface thereof a distributed pattern of raised ridges, and a coating on said surface of a material which is resistant to scarring, which can withstand temperatures up to 600° F. and which neither contaminates nor sticks to food.

One embodiment of this invention is shown in the accompanying drawings, in which like numerals denote like parts throughout the several views, and in which.

Figure 1:
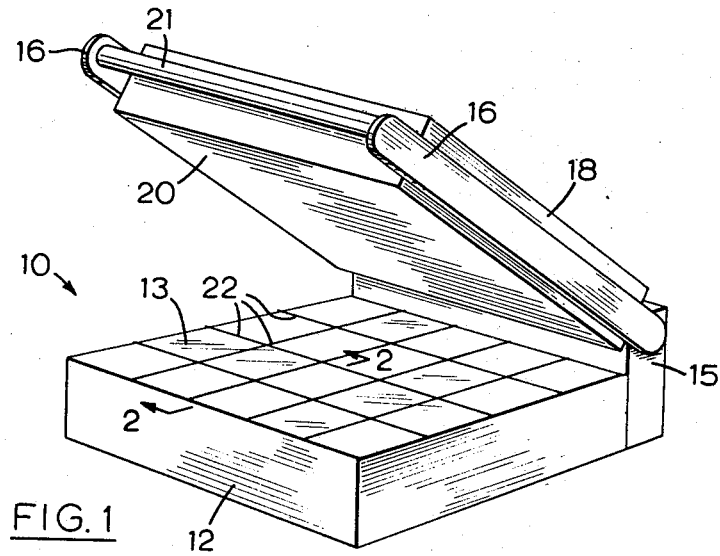
FIGURE 1 is a perspective view of a sandwich griller incorporating the invention.

Turning firstly to FIGURE 1, a sandwich griller 10 incorporating this invention is seen to comprise a base plate 12 having a grilling surface 13, an upstanding rear portion 15, two pivot arms 16 pivoted to the rear portion 15 and supporting between them an upper plate 18 having a grilling surface 20, and a handle 21.

On the grilling surface 13 of the base plate 12 is coated a layer of a material which is resistant to scarring, which can withstand temperatures up to 600° F. and which neither contaminates nor sticks to food. The physical characteristics of PTFE make it well-suited for this use, and it is the material most commonly employed.

Figure 2:
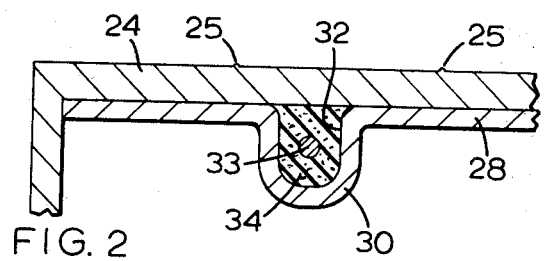
FIGURE 2 is a sectional view taken at 2—2 in FIGURE 1.
Figures 3, 4:
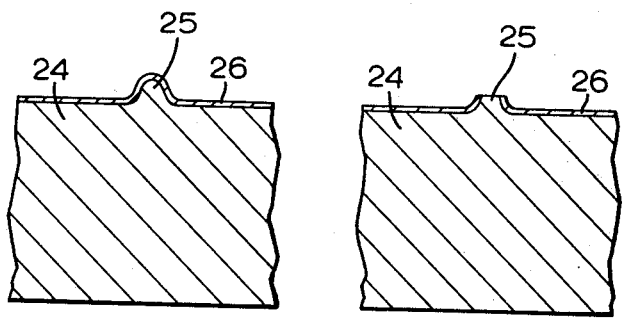
FIGURES 3 and 4 are sectional views, to larger scale than FIGURE 3, showing a small portion of the upper surface of the section of FIGURE 2.

FIGURE 1 shows, on the surface 13 of the base plate 12, a grid pattern 22 consisting of two families of mutually perpendicular straight lines. This grid pattern 22 is defined by raised ridges formed integrally with the metallic sublayer of the surface 13. Turning now to FIGURE 2, a sectional view of the surface 13 is shown. A metallic sublayer 24 has raised ridges 25 integrally formed therewith in the grid pattern 22 shown in FIGURE 1. A coating of a material such as PTFE is bonded to the sublayer 24, but is too thin to be visible in FIGURE 2. FIGURES 3 and 4 show the sublayer 24 and one ridge 25 to a larger scale, and the coating 26 is visible in these figures. FIGURE 3 shows the ridge 25 to be of a height several times the thickness of the coating 26. By way of example only, the thickness of the coating 26 could be 2 or 3 thou, while the height of the ridges 25 could be from 10 to 15 thou. The thickness of the coating 26 will be to some extent governed by considerations of cost and of the heat insulating property of the coating, both of these becoming undesirably great if the coating 26 is too thick. It is preferable that the ridges project above the coating 26, because their function is to prevent the coating 26 from being scraped away by spatulas, knives, etc. during the cleaning of the surface 13. However, it will be appreciated that some protection results regardless of the height of the ridges 25, and this invention is not to be considered limited to ridges of greater height than the thickness of the coating.

Any of several conventional means for applying heat to the metallic sublayer 24 can be employed. The means shown in FIGURE 2 comprises a metallic plate 28 having a hollow raised portion 30 which can be circular, sinusoidal, etc. in plan. The plate 28 is welded or otherwise rigidly secured to the sublayer 24 such that a circular or sinusoidal passage 32 is defined between the plate 28 and the sublayer 24. An electric heating element 33 extends centrally through the passage 32, and is insulated from the plate 28 and the sublayer 24 by means of a suitable insulating material 34, for example, aluminum oxide. Alternatively, the element 33 could be cast within the sublayer 24.

The grilling surface 20 of the upper plate 18 can also be provided with a grid of raised ridges, although this has not been shown in FIGURE 1.

Conventional methods of applying the coating 26, well known to those skilled in the art, would result in the cross section shown in FIGURE 3 immediately after the process of application. As can be seen, the coating 26 completely covers the ridges 25 such that the upper edges of the latter do not show. The manufacturer can then, if he desires, remove the coating 26 from the tops of the ridges 25 by abrasion or by scraping, prior to sale. If the manufacturer does not remove the coating 26 from the tops of the ridges 25, this removal will take place anyway after the user of the utensil has cleaned it a few times. After repeated cleanings and scrapings, the upper portion of the ridges 25 will likely be abraded away to the configuration shown in FIGURE 4, but further reduction in ridge height will take place only slowly or not at all.

It is to be pointed out that, while a grid pattern has been shown for the ridges 25, it is not essential that this pattern be used. A pattern of concentric rings, a sinusoidal pattern, or any other pattern which is distributed substantially uniformly over the surface 13, would work as satisfactorily as the pattern shown.

It will be appreciated that this invention is applicable to any grilling or heating surface which requires cleaning, such as pans or grills adapted to be heated externally from separate sources of heat.

The sublayer 24 can be of any heat-conductive material, but is preferably a metal, for example aluminum, copper or iron.

While a preferred embodiment of this invention has been disclosed herein, those skilled in the art will appreciate that changes and modifications may be made therein without departing from the spirit and scope of this invention as defined in the appended claims.

What I claim as my invention is:

1. In a grilling device, a grilling element comprising in combination:

a substantially flat heat conductive sublayer presenting on one surface thereof a pattern of ridges upstanding thereabove at a substantially uniform height and integral therewith, said surface having a thin coating bonded thereto of material resistant to scarring and capable of withstanding temperatures up to 600 degrees Fahrenheit and which neither contaminates nor sticks to articles of food, the heat conductive sublayer and integral ridges having a greater hardness than said coating, and the pattern of ridges being arranged and the height dimension thereof selected such that a substantial area of contact of the coated portions of the flat heat conductive sublayer between the ridges is presented to an article of food adapted to be placed thereon and whereby said latter portions are adapted to be protected from scarring, and means for heating said heat conductive sublayer.

2. A grilling device as claimed in claim 1, in which said thin coating is polytetrafluoroethylene.

3. A grilling device as claimed in claim 1, in which the height dimension of said ridges is greater than the thickness of said coating.

4. A grilling device as claimed in claim 1, in which said sublayer is metallic.

5. A grilling device according to claim 1, in which said pattern of ridges has the appearance of one of two families of mutually perpendicular straight lines:

concentric circles, a family of sinusoidal lines.

6. In a grilling device for grilling sandwiches and the like:

a base, a grilling element mounted on said base and presenting a grilling surface uppermost which extends generally horizontally, an upper section hingedly connected at one side of said base to swing from a position of overlying registration to said base to a position thereabove, said upper section presenting a grilling surface lowermost to cooperate with said first mentioned grilling surface in said position of overlying registration, the grilling surface of said grilling element comprising a metallic sublayer presenting a pattern of metallic ridges upstanding thereabove at a substantially uniform height and integral therewith and having a thin coating bonded thereto of material resistant to scarring and capable of withstanding temperatures up to 600 degrees Fahrenheit and which neither contaminates nor sticks to articles of food, the pattern of ridges being arranged and the height dimension thereof selected such that a substantial area of contact of the coated portions of said metallic sublayer between the ridges is presented to an article of food adapted to be placed thereon and whereby said latter portions are adapted to be protected from scarring, and means for heating said metallic sublayer.

7. A grilling device according to claim 6, in which the grilling surface of said upper section comprises a metallic sublayer presenting a pattern of metallic ridges upstanding therefrom at a substantially uniform height and integral therewith, and having a thin coating bonded thereto of material resistant to scarring and capable of withstanding temperatures up to 600 degrees Fahrenheit and which neither contaminates nor sticks to articles of food, the pattern of ridges being arranged and the height dimension thereof selected such that a substantial area of contact of the coated portions of said metallic sublayer between the ridges is presented to an article of food adapted to be contacted.

References Cited

UNITED STATES PATENTS

| 3,191,004 | 6/1965 | Hocker | 219—521 X |
| 2,762,116 | 9/1956 | Rudner | 174—110.6 |
| 1,644,255 | 10/1927 | Kercher et al. | 219—461 |

BERNARD A. GILHEANY, Primary Examiner

H. B. GILSON, Assistant Examiner

U.S. Cl. X.R.
174—110.6; 219—461